US009269959B2

(12) United States Patent
Wang et al.

(10) Patent No.: US 9,269,959 B2
(45) Date of Patent: Feb. 23, 2016

(54) LITHIUM ION BATTERY ELECTRODE

(71) Applicants: Jia-Ping Wang, Beijing (CN); Kai-Li Jiang, Beijing (CN); Shou-Shan Fan, Beijing (CN)

(72) Inventors: Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/676,426

(22) Filed: Nov. 14, 2012

(65) Prior Publication Data

US 2014/0017563 A1 Jan. 16, 2014

(30) Foreign Application Priority Data

Jul. 13, 2012 (CN) .......................... 2012 1 02423571

(51) Int. Cl.
| | |
|---|---|
| *H01M 4/66* | (2006.01) |
| *H01M 4/62* | (2006.01) |
| *H01M 10/04* | (2006.01) |
| *H01M 10/0525* | (2010.01) |
| *B82Y 99/00* | (2011.01) |
| *B82Y 30/00* | (2011.01) |

(52) U.S. Cl.
CPC .............. *H01M 4/663* (2013.01); *H01M 4/625* (2013.01); *H01M 4/667* (2013.01); *H01M 10/04* (2013.01); *H01M 10/0525* (2013.01); *B82Y 30/00* (2013.01); *B82Y 99/00* (2013.01); *Y02E 60/122* (2013.01); *Y10S 977/948* (2013.01)

(58) Field of Classification Search
None
See application file for complete search history.

(56) References Cited

U.S. PATENT DOCUMENTS

| | | | | |
|---|---|---|---|---|
| 8,551,657 | B2 * | 10/2013 | Yoshida et al. | 429/231.8 |
| 2009/0075171 | A1 * | 3/2009 | Feng et al. | 429/209 |
| 2010/0183920 | A1 | 7/2010 | Shaffer, II et al. | |
| 2010/0323246 | A1 * | 12/2010 | Feng et al. | 429/232 |
| 2011/0165466 | A1 * | 7/2011 | Zhamu et al. | 429/231.8 |
| 2012/0045688 | A1 * | 2/2012 | Liu et al. | 429/207 |
| 2013/0089769 | A1 * | 4/2013 | Proctor et al. | 429/127 |
| 2013/0224590 | A1 | 8/2013 | Divigalpitiya | |
| 2014/0315083 | A1 | 10/2014 | Liu et al. | |

FOREIGN PATENT DOCUMENTS

| | | |
|---|---|---|
| CN | 101420021 | 4/2009 |
| CN | 102208598 | 10/2011 |
| CN | 102272978 | 12/2011 |
| TW | 201227769 | 7/2012 |
| WO | 2011057263 | 5/2011 |

OTHER PUBLICATIONS

U.S. Appl. No. 13/273,116, filed Oct. 2011, Bhardwaj et al.*

* cited by examiner

*Primary Examiner* — Patrick Ryan
*Assistant Examiner* — Christopher Domone
(74) *Attorney, Agent, or Firm* — Novak Druce Connolly Bove + Quigg LLP

(57) ABSTRACT

A current collector includes a support and at least one graphene layer located on the support. The support includes two surfaces. The at least one graphene layer is located on one of the two surfaces of the support. The at least one graphene layer includes a number of uniformly distributed graphenes.

12 Claims, 8 Drawing Sheets

LITHIUM ION BATTERY ELECTRODE

CROSS-REFERENCE TO RELATED APPLICATIONS

This application claims all benefits accruing under 35 U.S.C. §119 from China Patent Application No. 201210242357.1, filed on Jul. 13, 2012, in the China Intellectual Property Office, the disclosure of which is incorporated herein by reference. The application is also related to copending applications entitled, "METHOD FOR MAKING LITHIUM ION BATTERY," filed Ser. No. 13/662,718; "LITHIUM ION BATTERY," filed Ser. No. 13/662,727; "LITHIUM ION BATTERY," filed Ser. No. 13/628,237; "METHOD FOR MAKING LITHIUM ION BATTERY ELECTRODE," filed Ser. No. 13/662,768; "METHOD FOR MAKING LITHIUM ION BATTERY", filed Ser. No. 13/630,004; "THIN FILM LITHIUM ION BATTERY", filed Ser. No. 13/685,802; "METHOD FOR MAKING THIN FILM LITHIUM ION BATTERY", filed Ser. No. 13/685,803.

BACKGROUND

1. Technical Field

The present disclosure relates to current collectors and lithium ion batteries using the current collectors.

2. Description of Related Art

A lithium ion battery includes a case, an anode, a cathode, a non-aqueous electrolyte, and a separator. The anode and the cathode are both lithium battery electrodes. The anode, cathode, non-aqueous electrolyte, and separator are encapsulated in the case. The separator is located between the anode and the cathode. The anode, cathode, and separator are infiltrated by the non-aqueous electrolyte. The cathode includes a cathode current collector and a cathode material layer disposed on a surface of the cathode current collector. The anode includes an anode current collector and an anode material layer disposed on a surface of the anode current collector.

The current collector is used to collect the charge generated by the lithium ion battery during discharge, and to connect to an external power source during the recharging of the lithium ion battery. The current collectors are usually made of metal foils, such as copper foil and aluminum foil. However, the metal foils have a relatively large weight. The power density is calculated by power/weight. Therefore, a large weight of the current collector will decrease the power density of a lithium ion battery. Furthermore, the metal foils may be corroded by the electrolyte, which decreases the life span of the lithium ion battery.

What is needed, therefore, is to provide a current collector having relatively low weight and high resistance to corrosion, and a lithium ion battery electrode using the current collector.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
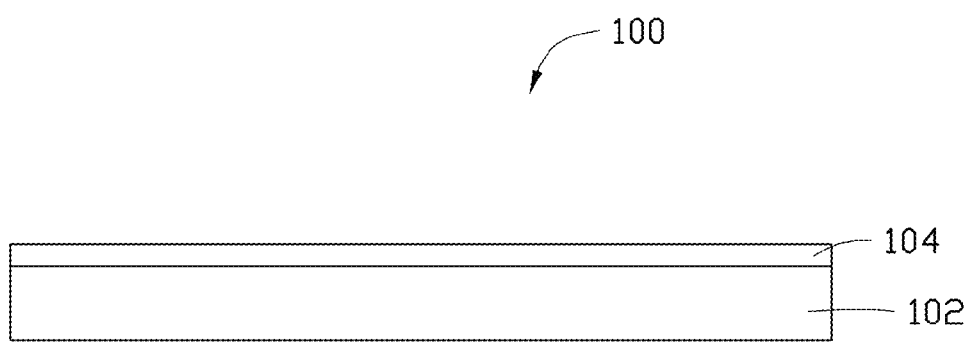
FIG. 1 is a schematic side view of one embodiment of a current collector.

Referring to FIG. 1, an embodiment of a current collector 100 used in a lithium ion battery includes a support 102 and a graphene layer 104. The graphene layer 104 is located on a surface of the support 102.

The support 102 is configured to support the graphene layer 104. The material of the support 102 has a relatively small density and has a relatively good resistance to corrosion, such as polymer materials, ceramics, crystal, and glass. The material of the support 102 can be an electrically insulating material. The support 102 can have a layered shape, such as a sheet, a film, or a plate. The thickness of the support 102 can be in a range from about 1 micron to about 1 millimeter.

A thickness of the graphene layer can be less than 10 micrometers. In some embodiments, the thickness of the graphene layer is in a range from about 10 nanometers to about 200 nanometers. The graphene layer includes at least one graphene. The graphene is a one-atom-thick planar sheet of $sp^2$-bonded carbon atoms that are densely packed in a honeycomb crystal lattice. The size of the graphene can be very large (e.g., several millimeters). However, the size of the graphene is generally less than 10 microns (e.g., 1 micron). In one embodiment, the graphene layer is a pure structure of graphene. The graphene layer can be or include a single graphene or a plurality of graphenes. In one embodiment, the graphene layer includes a plurality of graphenes stacked with each other or located side by side. The plurality of graphenes is combined with each other by van der Waals attractive force. The graphene layer can be a continuous integrated structure. The term "continuous integrated structure" includes, but is not limited to a structure that is combined by a plurality of chemical covalent bonds (e.g., $sp^2$ bonds, $sp^1$ bonds, or $sp^3$ bonds) to form an overall structure. A thickness of the graphene layer can be less than 1 millimeter.

The graphene layer 104 can be adhered to the surface of the support 102 by using an adhesive or only by van der Waals attractive force therebetween. The graphene layer 104 can be directly adhered to the surface of the support without using any adhesive, and only by van der Waals attractive force between the graphene layer and the surface of the substrate. When the material of the support 102 is a polymer material, the graphene layer 104 can be fixed on the surface of the support 102 by a hot pressing method.

The current collector 100 can further include a conducting tab (not shown) electrically connected to the graphene layer 104. The material of the conducting tab can be a conducting material such as metal. To prevent the corrosion of the conducting tab by the electrolyte, a protecting layer can be coated on an outside surface of the conducting tab. In one embodiment, a polymer material layer is coated on the conducting tab after the conducting tab is connected to the graphene layer 104.

The current collector 100 includes the graphene layer 104 and the support 102. The support 102 comprises a material that has a relatively small density and good corrosion resistance, and the support 102 does not need to be conductive. The graphene layer 104 can have relatively good conductivity, stable chemical and electrical stability, and low weight. Therefore, the current collector can have a low weight, and the current collector does not corrode easily, thus have a relatively long life span.

Figure 2:
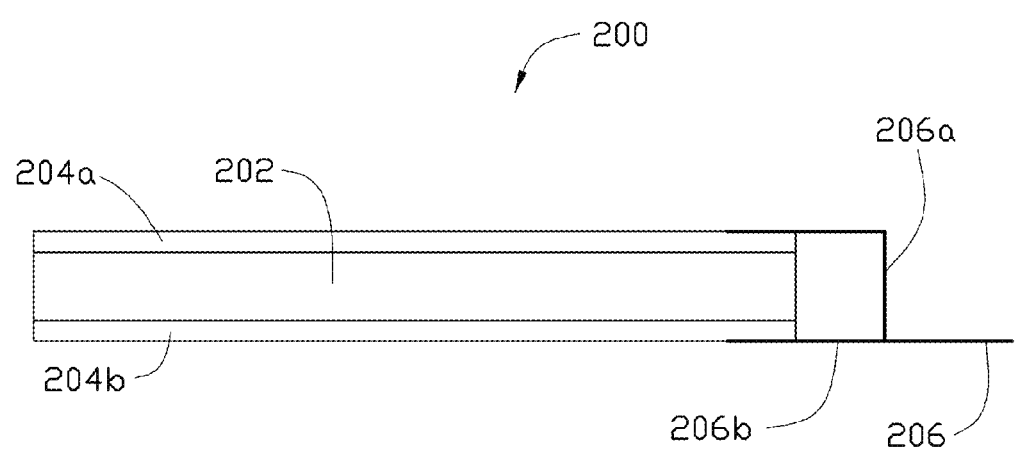
FIG. 2 is a schematic side view of another embodiment of a current collector.

Referring to FIG. 2, another embodiment of a current collector 200 includes a support 202 having two opposite surfaces, a first graphene layer 204a, and a second graphene layer 204b. The first graphene layer 204a and the second graphene layer 204b are respectively located on the two opposite surfaces of the support 202. The first graphene layer 204a and the second graphene layer 204b can both have the same structure as the graphene layer 104 of the above described embodiment. In the same current collector 200, the first graphene layer 204a and the second graphene layer 204b can have the same or different structures.

The current collector 200 can include a conducting tab 206 electrically connected to the first and second graphene layers 204a, 204b. The conducting tab 206 can have two branches, which are the first branch 206a and the second branch 206b. The first branch 206a is electrically connected to the first graphene layer 204a, and the second branch 206b is electrically connected to the second graphene layer 204b. The electrical connection between the branches 206a, 206b and the carbon nanotube layers 204a, 204b can be the same as the electrical connection between the connecting tab and the graphene layer 104 in the above described embodiment.

The other structures and properties of the current collector 200 are the same as the current collector 100 of the above described embodiment.

Figure 3:
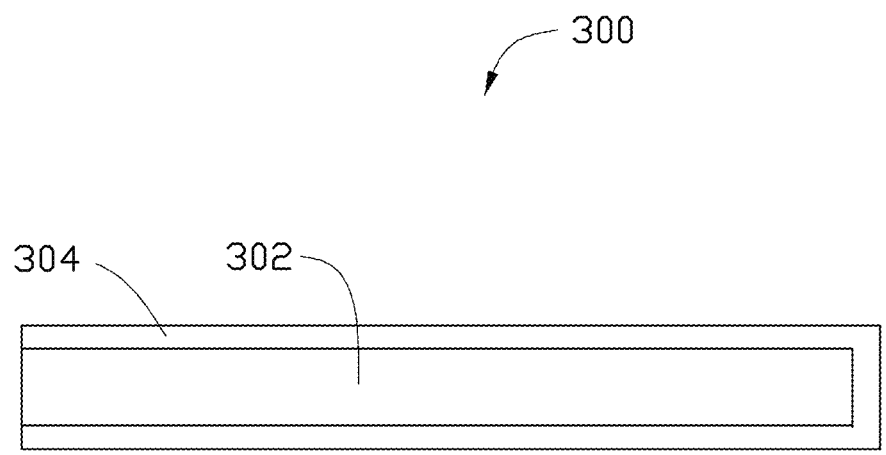
FIG. 3 is a schematic side view of yet another embodiment of a current collector.

Referring to FIG. 3, another embodiment of a current collector 300 includes a support 302 and a graphene layer 304. The support 302 has two opposite surfaces. The graphene layer 304 is curved and covers both the two opposite surfaces of the support 302, and it also covers a side wall connecting the two opposite surfaces of the support 302. The graphene layer 304 can have a U shape wrap around the support 302. In another embodiment, the graphene layer 304 can entirely wrap the support 302. The graphene layer 304 can have the same structure as the graphene layer 104 of the above described embodiment.

The current collector 300 can further include a conducting tab (not shown) electrically connected to the graphene layer 304. The electrical connection between the conducting tab and the graphene layer 304 can be the same as the electrical connection between the conducting tab and the graphene layer 104 in the above described embodiment.

The other structure and property of the current collector 300 are the same as the current collector 100 of the above described embodiment.

Figure 4:
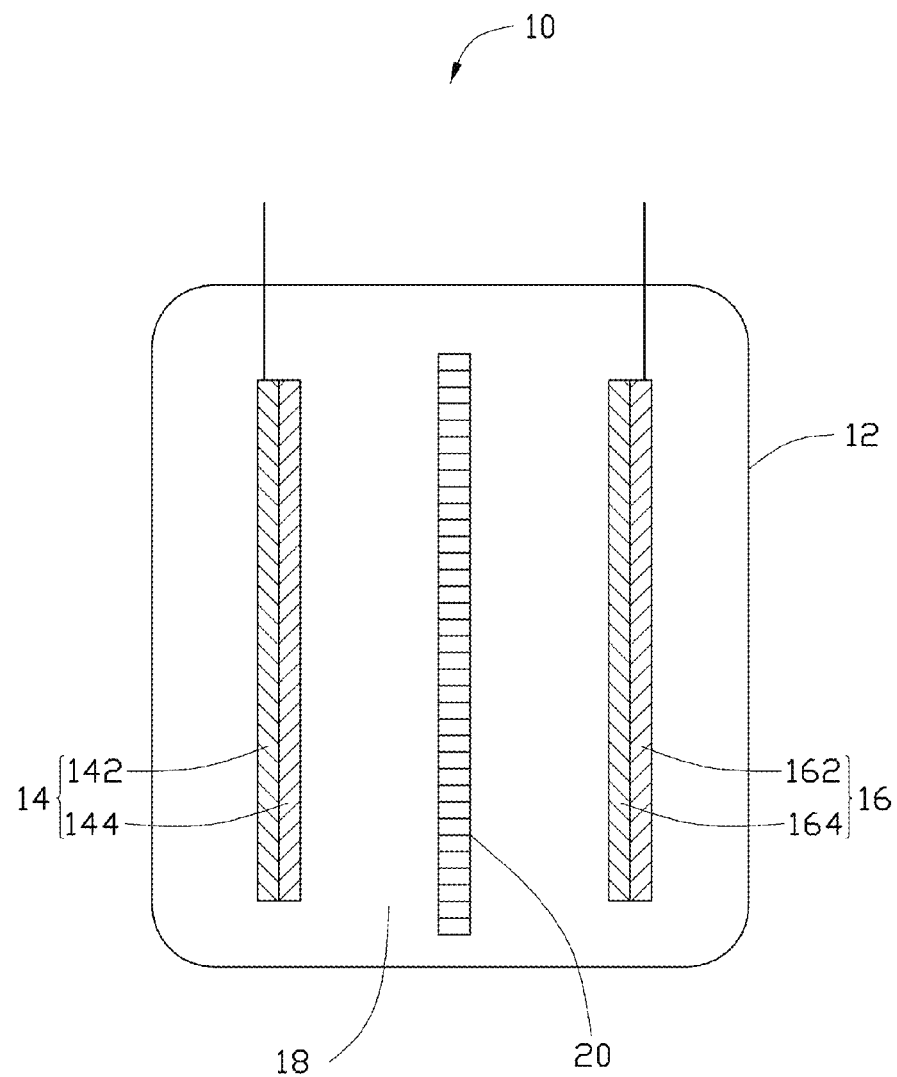
FIG. 4 is a schematic cross-sectional view of one embodiment of a lithium ion battery.

Referring to FIG. 4, a lithium ion battery 10 using the above described current collector includes a battery case 12, a cathode electrode 14, an anode electrode 16, an electrolyte 18 and a separator 20. The cathode electrode 14, the anode electrode 16, the electrolyte 18, and the separator 20 are encapsulated by the battery case 12. The electrolyte 18 is a liquid and is filled in the battery case 12. The cathode electrode 14, the anode electrode 16 and the separator 20 are located in the electrolyte 18. The separator 20 is located between the cathode electrode 14 and the anode electrode 16. Although only one cathode electrode 14 and one anode electrode 16 are shown in the FIG. 4, the lithium ion battery 10 can include a plurality of cathode electrodes 14 and a plurality of anode electrodes 16 alternatively stacked with each other. Each pair of the adjacent cathode electrodes 14 and anode electrodes 16 has a separator. The number of the cathode electrodes 14 and anode electrodes 16 is not limited. In one embodiment, the lithium ion battery 10 can include a single layer and up to 100 or more layers of cathode electrodes 14 and anode electrodes 16. In one embodiment, the lithium ion battery 10 respectively includes 20 layers to 50 layers of cathode electrodes 14 and anode electrodes 16.

The cathode electrode 14 includes a planar shaped cathode current collector 142 and a cathode material layer 144 located on a surface of the planar shaped cathode current collector 142. The cathode current collector 142 includes at least one graphene layer. The cathode material layer 144 is located on a surface the at least graphene layer. The cathode material layer 144 can include cathode active material, conductive agent, and adhesive. The cathode active material can be lithium manganate ($LiMn_2O_4$), lithium cobalt oxide ($LiCoO_2$), lithium nickel oxide ($LiNiO_2$) or lithium iron phosphate ($LiFePO_4$). The conductive agent can be acetylene black, carbon fiber, or carbon nanotube. The adhesive can be polyvinylidene fluoride (PVDF) or polytetrafluoroethylene (PTFE). A thickness of the cathode material layer 144 can be in a range from about 100 micrometers to about 300 micrometers. In one embodiment, the thickness of the cathode material layer 144 is about 200 micrometers.

Figure 5:
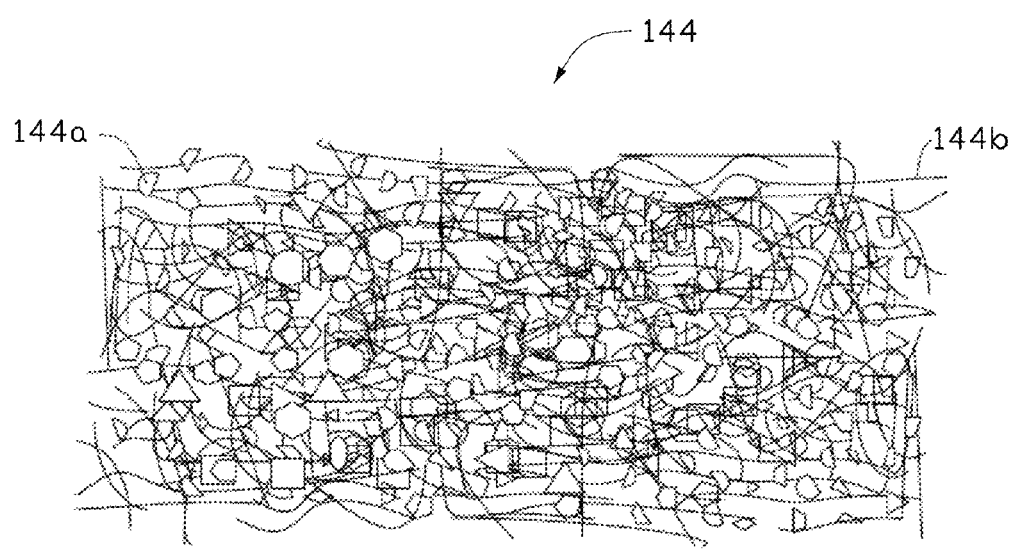
FIG. 5 is a schematic cross-sectional view of one embodiment of a cathode electrode material.
Figure 6:
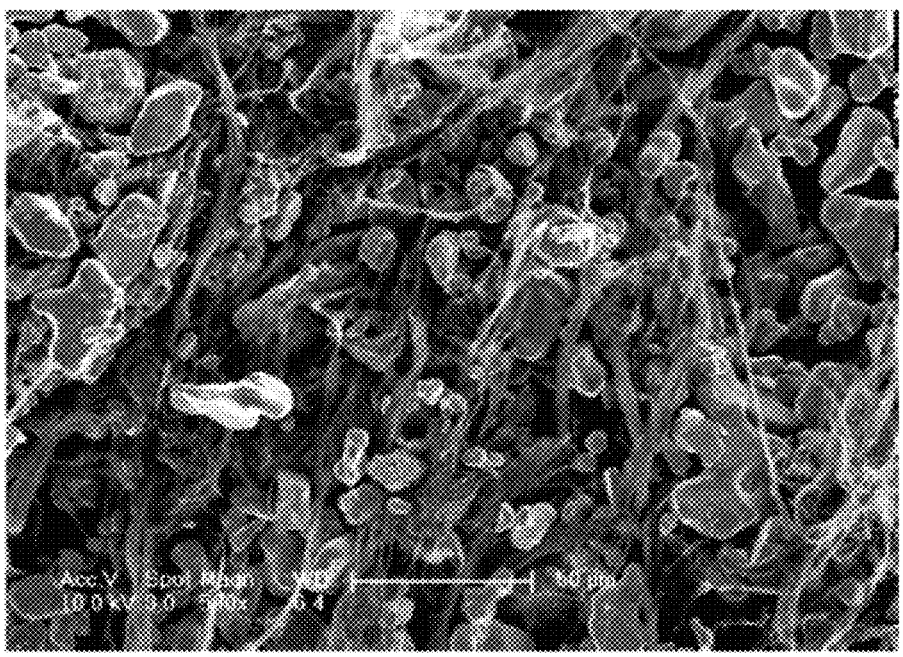
FIG. 6 is a scanning electron microscope (SEM) of one embodiment of a cathode electrode material.

In another embodiment, the cathode material layer 144 consists of cathode active material and carbon nanotubes, e.g., the cathode material layer 144 is free of adhesive. The cathode material layer 144 can further include acetylene black, carbon fiber, or any other conductive agent. In the embodiment according to FIGS. 5 and 6, the cathode material layer 144 only includes cathode active material particles 144a and carbon nanotubes 144b. A shape of the cathode active material particles 144a is not limited, and can be irregular or regular. A diameter of the cathode active material particles 144a is not limited, and can be less than 15 micrometers. In one embodiment, the cathode active material particles 144a can be lithium cobalt oxide particles having a diameter less than 15 micrometers. The carbon nanotubes 144b are entangled with each other and combined by van der Waals attractive force therebetween, thereby forming an integral continuous net structure having a plurality of micropores defined by the carbon nanotubes 144b. The plurality of cathode active material particles 144a are dispersed in the net structure and attached on the surface of the carbon nanotubes 144b. The carbon nanotube 144b is substantially pure, and has no impurities adhered thereon. The carbon nanotubes 144b in the lithium ion battery cathode 10 can serve as a conductive material and microporous carrier to support and fix the cathode active material particles 144a. Thus, even without using an adhesive, the lithium ion battery cathode material layer can be an integrative stable structure due to the net structure composed of the carbon nanotubes 144b. The cathode active material particles 144a are uniformly distributed in the net structure. Specifically, the cathode active material particles 144a can be adhered on or entangled by the carbon nanotubes, or the cathode active material particles 144a can be wrapped by the carbon nanotubes. The cathode active material particles 144a and the carbon nanotubes are in contact with each other without adhesive therebetween. The cathode active material particles 144a and the carbon nanotubes are fixed together by van der Waals attractive force therebetween. A length of the carbon nanotubes can be longer than 200 micrometers, and the carbon nanotubes can be entangled with each other to form the net structure. As such, the cathode active material particles 144a can be fixed by the net structure, and the cathode material layer 144 can be free of adhesive.

The anode electrode 16 includes a planar shaped anode current collector 162 and an anode material layer 164 located on a surface of the planar shaped anode current collector 162. The anode current collector 162 includes at least one graphene layer. The anode material layer 164 is located on a surface the at least graphene layer. The cathode material layer 144 of the cathode electrode 14 faces the anode material layer 164 of the anode electrode 16. The anode material layer 164 can include anode active material, conductive agent, and adhesive. The anode active material can be natural graphite, pyrolysis carbon, or mesocarbon microbeads (MCMB). The conductive agent can be acetylene black, carbon fiber, or carbon nanotube. The adhesive can be PVDF or PTFE. A thickness of the anode material layer 164 can be in a range from about 50 micrometers to about 200 micrometers. In one embodiment, the thickness of the anode material layer 164 is about 100 micrometers.

In another embodiment, the anode material layer 164 consists of anode active material and carbon nanotubes, e.g., the anode material layer 164 is free of adhesive. The anode material layer 164 can further include acetylene black, carbon fiber, or any other conductive agent. In one embodiment, the anode material layer 164 only includes anode active material particles and carbon nanotubes. A shape of the anode active material particles is not limited, and can be irregular or regular. A diameter of the anode active material particles is not limited, and can be less than 15 micrometers. The carbon nanotubes are entangled with each other and combined by van der Waals attractive force therebetween, thereby forming an integral continuous net structure having a plurality of micropores defined by the carbon nanotubes. The plurality of anode active material particles are dispersed in the net like structure and attached on the surface of the carbon nanotubes. The anode active material particles are uniformly distributed in the net structure. Specifically, the anode active material particles can be adhered on or entangled by the carbon nanotubes, or the anode active material particles can be wrapped by the carbon nanotubes. Thus, even without using adhesive, the anode material layer 164 can be an integrative stable structure due to the net structure composed of the carbon nanotubes, and the anode material layer 164 is free of adhesive.

At least one of the cathode current collector 142 and the anode current collector 162 has the same structure as the current collector 100, current collector 200, or the current collector 300.

Figure 7:
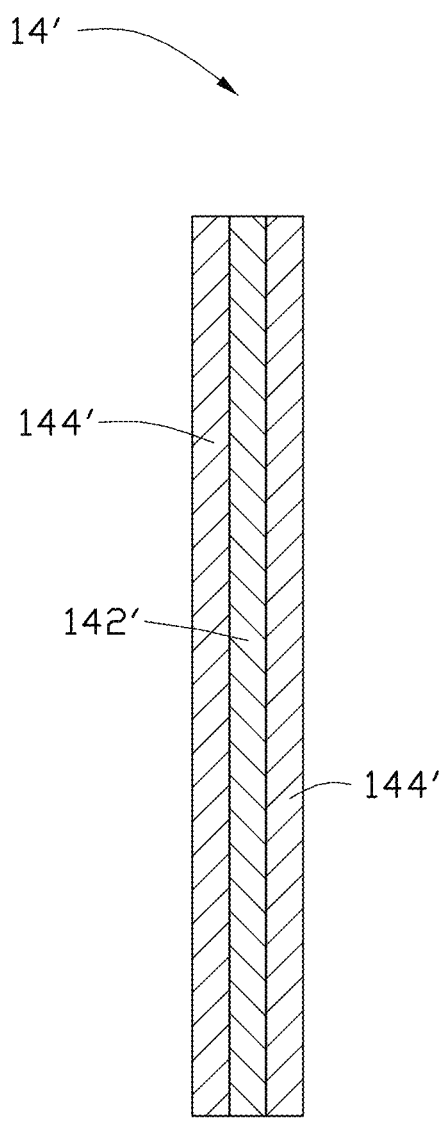
FIG. 7 is a schematic side view of an embodiment of a cathode electrode.
Figure 8:
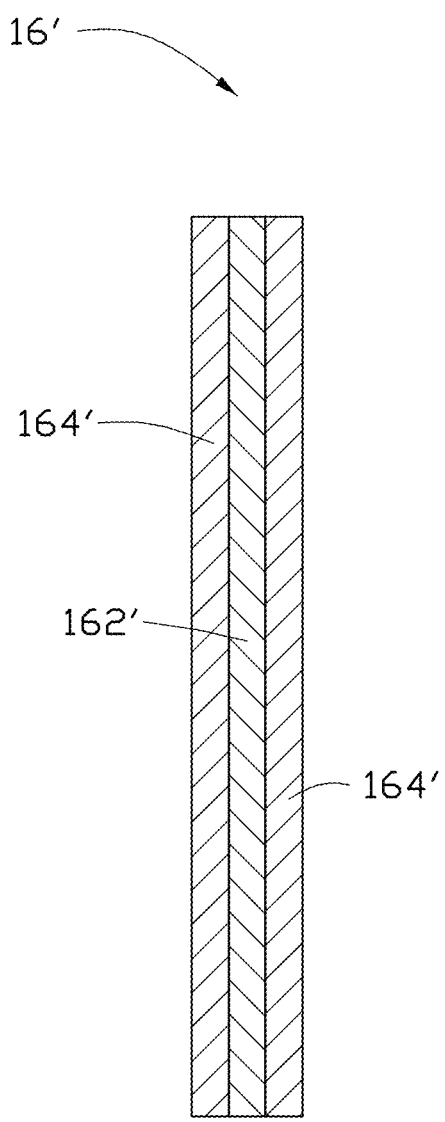
FIG. 8 is a schematic side view of another embodiment of a cathode electrode.

Referring to FIG. 7 and FIG. 8, in another embodiment, the cathode current collector 142' and the anode current collector 162' both use the current collectors 200, 300 in the above described embodiments. The cathode electrode 14' includes two cathode material layers 144' respectively located on the two opposite surfaces of the cathode current collector 142'. The anode electrode 16' includes two anode material layers 164' respectively located on the two opposite surfaces of the anode current collector 162'. The cathode electrode 14' and the anode electrode 16' are stacked with each other, and the cathode electrode 14' and the anode electrode 16' are separated by the separator 20. The cathode conducting tab (not shown) of the cathode current collector 142' and the anode conducting tab (not shown) of the anode current collector 162' are used to electrically connect the lithium ion battery to an outer charge and/or discharge circuit. When the lithium ion battery includes a plurality of stacked cathode electrodes and anode electrodes, the plurality of the cathode conducting tabs are electrically connected, and the plurality of the anode conducting tabs are electrically connected. The cathode conducting tabs and the anode conducting tabs are separated from each other.

The lithium ion battery using the current collector in the above described embodiments has minimal weight and maximum life span. The current collector can also be used in other batteries, such as nickel batteries and solar cells.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A lithium ion battery comprising:
a cathode electrode comprising a cathode current collector and a cathode material layer located on the cathode current collector, the cathode current collector comprises a first insulated support and a first graphene layer, and the first graphene layer is located on the first insulated support, the cathode material layer comprises a plurality of cathode active material particles and a plurality of first carbon nanotubes, and the plurality of cathode active material particles are wrapped by the plurality of first carbon nanotubes; and
an anode electrode comprising an anode current collector and an anode active material layer located on the anode current collector, the anode current collector comprises a second insulated support and a second graphene layer, and the second graphene layer is located on the second insulated support;
wherein the cathode material layer and the anode material layer are located between the first insulated support and the second insulated support; and
wherein at least one of the cathode current collector and the anode current collector comprises:
an insulated support comprising a first surface, a second, and a side surface, wherein the first surface is parallel with and opposite to the second surface, the side surface is substantially perpendicular to the first surface and second surface; and
a graphene layer defining a U-shape, the graphene layer is a single graphene, covers, and directly contacts the first surface, the second surface, and the side surface.

2. The lithium ion battery of claim 1, wherein the first graphene layer is one graphene.

3. The lithium ion battery of claim 1, wherein the cathode material layer is located on a surface of the first graphene layer.

4. The lithium ion battery of claim 3, wherein the cathode material layer consists of the plurality of cathode active material particles and the plurality of first carbon nanotubes.

5. The lithium ion battery of claim 4, wherein the plurality of first carbon nanotubes are entangled with each other and combined by van der Waals attractive force therebetween to form an integral continuous net structure having a plurality of micropores.

6. The lithium ion battery of claim 1, wherein the anode material layer is located on a surface of the second graphene layer.

7. The lithium ion battery of claim 6, wherein the anode material layer consists of a plurality of anode active material particles and a plurality of second carbon nanotubes.

8. The lithium ion battery of claim 7, wherein the plurality of second carbon nanotubes are entangled with each other and combined by van der Waals attractive force therebetween to form an integral continuous net structure having a plurality of micropores.

9. The lithium ion battery of claim 1, wherein the first graphene layer is a single graphene layer, and the single graphene layer is curved and located on the two opposite surfaces of the insulated support.

10. The lithium ion battery of claim 9, wherein the anode electrode comprises two anode material layers located on two surfaces of the anode current collector.

11. A lithium ion battery comprising:
a cathode electrode comprising a cathode current collector and a cathode material layer located on the cathode current collector, the cathode current collector comprises a first insulated support and a first graphene layer, and the first graphene layer is located on the first insulated support, the cathode material layer comprises a plurality of cathode active material particles and a plurality of carbon nanotubes, the plurality of cathode active material particles are disposed in and wrapped by the plurality of carbon nanotubes, and the plurality of carbon nanotubes are entangled with each other and combined by van der Waals attractive force therebetween to form an integral continuous net structure; and
an anode electrode comprising an anode current collector and an anode material layer located on the anode current collector; and wherein at least one of the cathode current collector and the anode current collector comprises:
an insulated support comprising a first surface, a second, and a side surface, wherein the first surface is parallel with and opposite to the second surface, the side surface is substantially perpendicular to the first surface and second surface; and
a graphene layer defining a U-shape, the graphene layer is a single graphene, covers, and directly contacts the first surface, the second surface, and the side surface.

12. A lithium ion battery comprising:
a cathode electrode comprising a cathode current collector and a cathode material layer located on the cathode current collector, the cathode current collector comprises a first insulated support and a first graphene layer, and the first graphene layer is located on the first insulated support; and
an anode electrode comprising an anode current collector and an anode material layer located on the anode current collector;
wherein at least one of the cathode current collector and the anode current collector comprises:
an insulated support comprising a first surface, a second, and a side surface, wherein the first surface is parallel with and opposite to the second surface, the side surface is substantially perpendicular to the first surface and the second surface; and
a graphene layer defining a U-shape, the graphene layer is a single graphene, covers, and directly contacts the first surface, the second surface, and the side surface.

* * * * *